US010766392B2

(12) United States Patent
Patel et al.

(10) Patent No.: US 10,766,392 B2
(45) Date of Patent: Sep. 8, 2020

(54) SEAT INCLUDING DEPLOYABLE PLATE

(71) Applicant: Ford Global Technologies, LLC, Dearborn, MI (US)

(72) Inventors: Deepak Patel, Canton, MI (US); Zhibing Deng, Northville, MI (US); Matthew B. Makowski, Northville, MI (US); Sean Timothy Ryan, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 112 days.

(21) Appl. No.: 15/835,389

(22) Filed: Dec. 7, 2017

(65) Prior Publication Data

US 2019/0176673 A1 Jun. 13, 2019

(51) Int. Cl.
*B60N 2/90* (2018.01)
*B60N 2/885* (2018.01)
*B60N 2/02* (2006.01)

(52) U.S. Cl.
CPC ............... *B60N 2/99* (2018.02); *B60N 2/885* (2018.02); *B60N 2/914* (2018.02); *B60N 2002/0288* (2013.01)

(58) Field of Classification Search
CPC ... B60N 2/914; B60N 2/99; B60N 2002/0288
USPC ................... 297/284.9, 112, 216.13, 216.14; 280/730.2
See application file for complete search history.

(56) References Cited

U.S. PATENT DOCUMENTS

| | | | | |
|---|---|---|---|---|
| 4,205,878 A * | 6/1980 | Wooten | ..................... | B60N 2/99 297/391 |
| 4,522,445 A * | 6/1985 | Goldner | ............... | B60N 2/1892 297/284.9 |
| 4,607,887 A * | 8/1986 | Vail | ......................... | A47C 7/18 297/452.26 |
| 4,636,000 A * | 1/1987 | Nishino | ................... | B60N 2/99 297/284.9 |
| 5,370,446 A * | 12/1994 | Bancod | .................... | A47C 7/38 297/408 |
| 5,669,665 A * | 9/1997 | Nowak | ................ | B60N 2/2803 297/284.9 |
| 5,904,405 A * | 5/1999 | Wu | ......................... | B60N 2/885 297/391 |
| 6,068,336 A * | 5/2000 | Schonauer | ............... | B60N 2/99 297/284.9 |
| 6,120,099 A * | 9/2000 | Reikerangs | ............ | B60N 2/809 297/391 |
| 6,139,106 A * | 10/2000 | Aldridge | ................ | A61C 19/00 297/391 |
| 6,299,197 B1 * | 10/2001 | Mueller | ................ | B60R 21/207 280/728.3 |

(Continued)

FOREIGN PATENT DOCUMENTS

JP       5020586 B2      6/2012
JP     2016210228 A    12/2016

*Primary Examiner* — Syed A Islam
(74) *Attorney, Agent, or Firm* — Frank A. MacKenzie; Bejin Bieneman PLC

(57) ABSTRACT

A seat includes a seat back frame and a mounting plate fixed to the seat back frame. A deployable plate is movably engaged with the mounting plate and is moveable away from the seat back frame from an undeployed position to a deployed position. An actuator is coupled to the deployable plate.

15 Claims, 7 Drawing Sheets

(56) References Cited

U.S. PATENT DOCUMENTS

| | | | |
|---|---|---|---|
| 7,219,957 B1 | 5/2007 | Khouri | |
| 7,726,739 B2 * | 6/2010 | Wain | B60N 2/986 297/284.9 |
| 7,963,602 B2 | 6/2011 | Spahn et al. | |
| 8,016,350 B2 * | 9/2011 | Dellanno | B60N 2/888 297/216.12 |
| 8,136,834 B2 * | 3/2012 | Fredriksson | B60R 21/207 280/730.2 |
| 8,820,830 B2 | 9/2014 | Lich et al. | |
| 8,985,622 B1 * | 3/2015 | Cannon | B60R 21/231 280/730.2 |
| 9,315,271 B2 * | 4/2016 | Oleson | B64D 11/0619 |
| 9,580,032 B1 | 2/2017 | Valdes | |
| 9,975,515 B2 * | 5/2018 | Tanabe | B60R 21/216 |
| 2006/0043777 A1 * | 3/2006 | Friedman | B60N 2/42727 297/216.13 |
| 2008/0111406 A1 * | 5/2008 | Friedman | B60N 2/42727 297/216.1 |
| 2009/0218858 A1 * | 9/2009 | Lawall | B60N 2/4235 297/216.1 |
| 2012/0086250 A1 * | 4/2012 | Stoessel | B60N 2/99 297/284.9 |
| 2015/0360596 A1 * | 12/2015 | Eisenbraun | B60R 21/207 296/64 |
| 2016/0214511 A1 * | 7/2016 | McMillen | B60N 2/643 |

\* cited by examiner

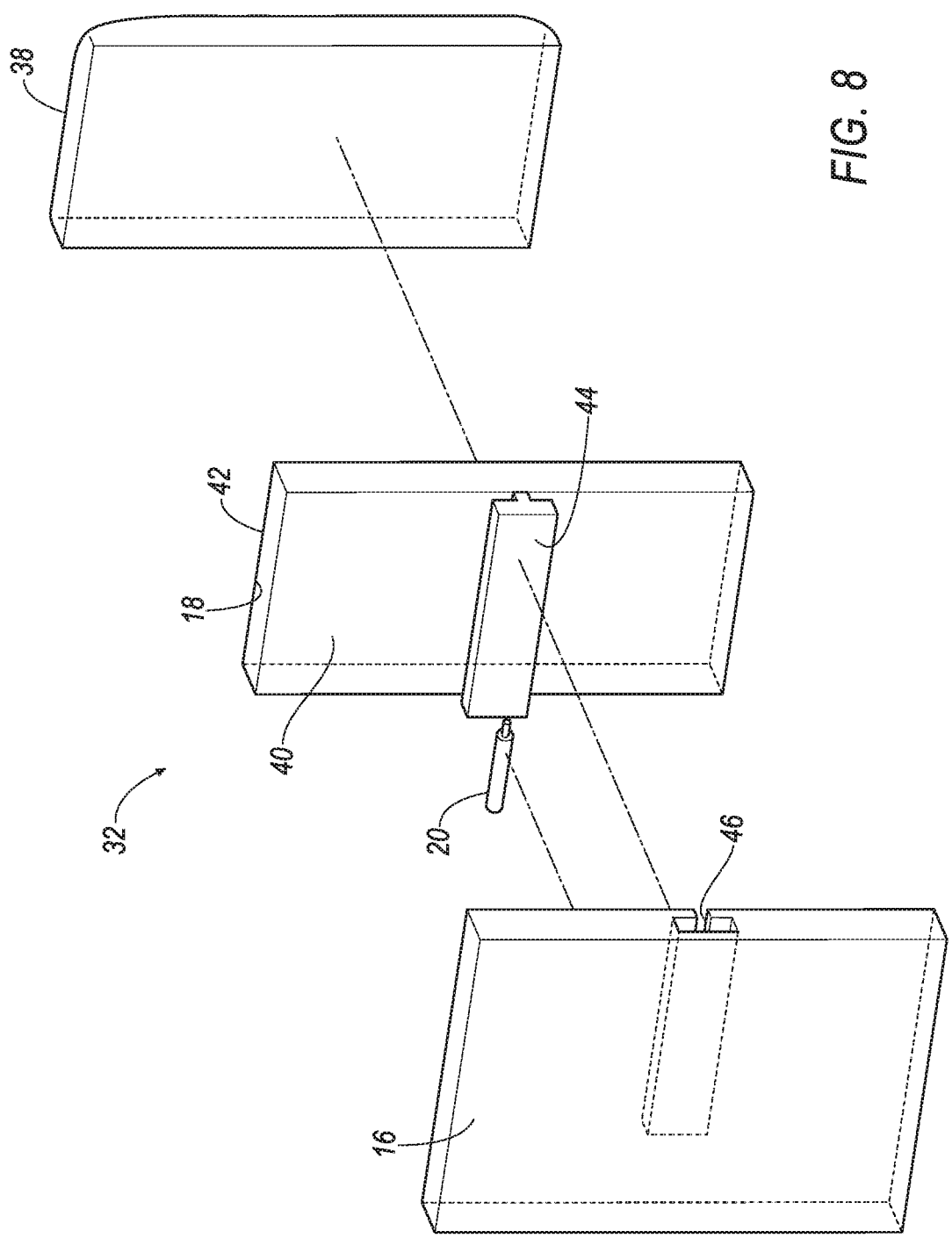

SEAT INCLUDING DEPLOYABLE PLATE

BACKGROUND

Vehicles impact be subject to impact tests to test the movement of vehicle occupants. Such tests may be standardized by various governmental or industry organizations. Some test, for example, measure the movement of vehicle occupants during vehicle impacts that move the vehicle occupants in cross-vehicle directions. These tests include side impact tests and oblique impact tests.

One example of a test that tests cross-vehicle movement of the occupant is the US New Car Assessment Program (USNCAP) test, in which the vehicle is oriented at 15 degrees relative to the moveable deformable barrier and overlaps the moveable deformable barrier at 35%. Other examples are the USNCAP side moveable deformable barrier test and the USNCAP side pole test. These tests measure the inboard motion of the head of the occupant to reduce the Brain Injury Criteria (BrIC). As another example, the European New Car Assessment Program (EuroNCAP) has a test standardized to test the far side protection during side impact. In particular, this test measures inboard motion of the head of the occupant. As another example, the National Highway Traffic Safety Administration (NHTSA) sets forth a standardized test procedure for a side pole crash test, which is designed to simulate a vehicle experiencing a side collision with a pole.

BRIEF DESCRIPTION OF THE DRAWINGS

FIG. 8 is an exploded view of the deployable device including a mounting plate, the deployable plate, a cushion, and an actuator.

DETAILED DESCRIPTION

Figure 1:
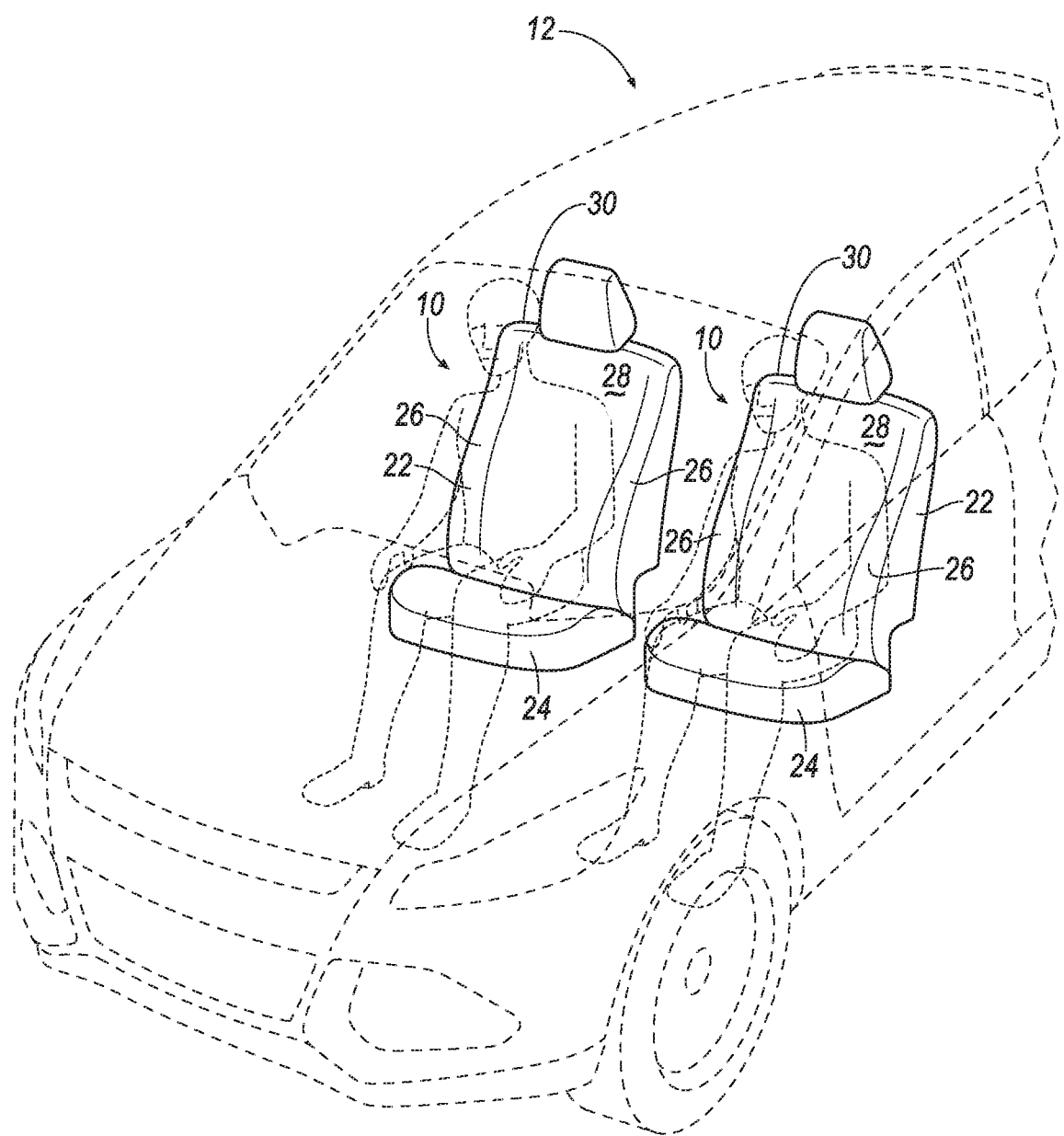
FIG. 1 is a perspective view of a vehicle including a left seat and a right seat.
Figure 4:
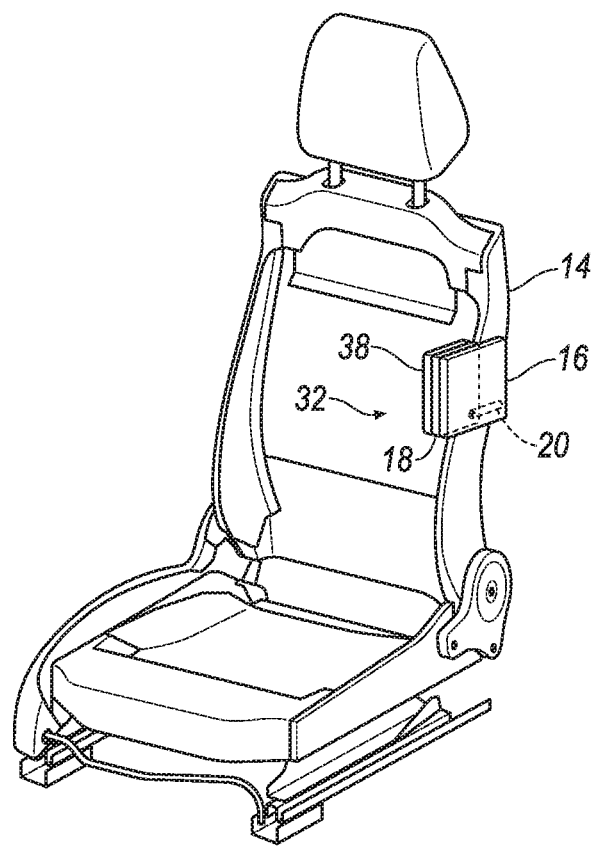
FIG. 4 is a perspective view of a portion of the right seat including a seat back frame and the deployable plate in an undeployed position.
Figure 5:
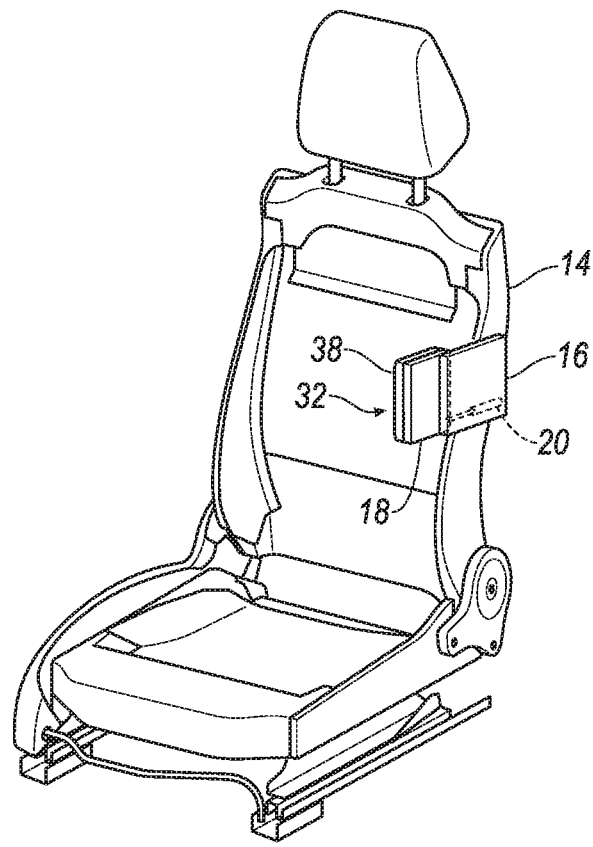
FIG. 5 is a perspective view of a portion of the right seat including the seat back frame and the deployable plate in the deployed position.
Figure 6:
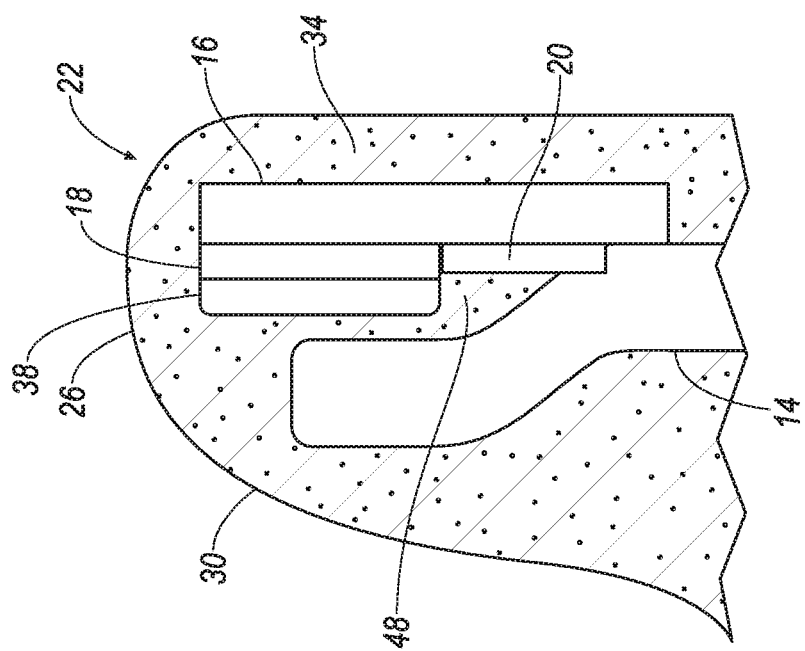
FIG. 6 is a cross-section of the seat back through the bolster with the deployable plate in the undeployed position.
Figure 9:
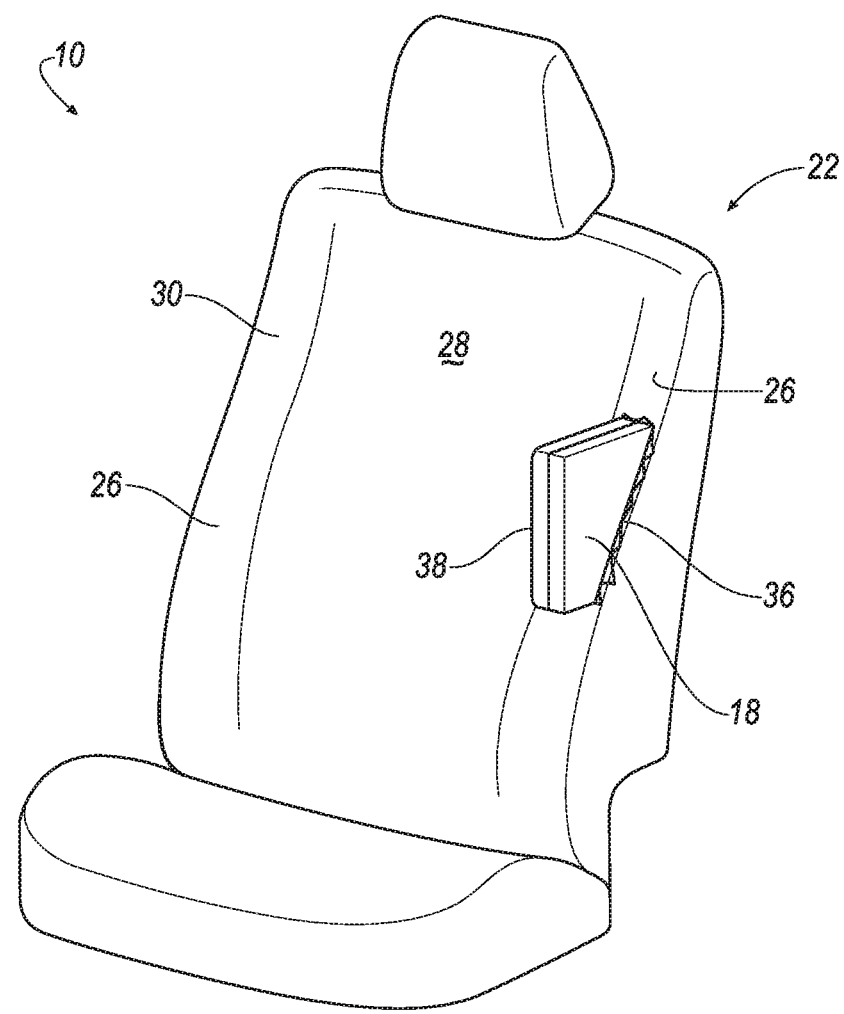
FIG. 9 is a perspective view of another embodiment of the right seat in which the deployable plate breaks through a covering in the deployed position.

With reference to the Figures, wherein like numerals indicate like parts throughout the several views, a seat 10 for a vehicle 12 includes a seat back frame 14 and a mounting plate 16 fixed to the seat back frame 14. A deployable plate 18 is movably engaged with the mounting plate 16 and is moveable away from the seat back frame 14 from an undeployed position, as shown in FIGS. 1, 4, and 6, to a deployed position, as shown in FIGS. 2, 3, 5, 7, and 8. An actuator 20 is coupled to the deployable plate 18.

Figure 2:
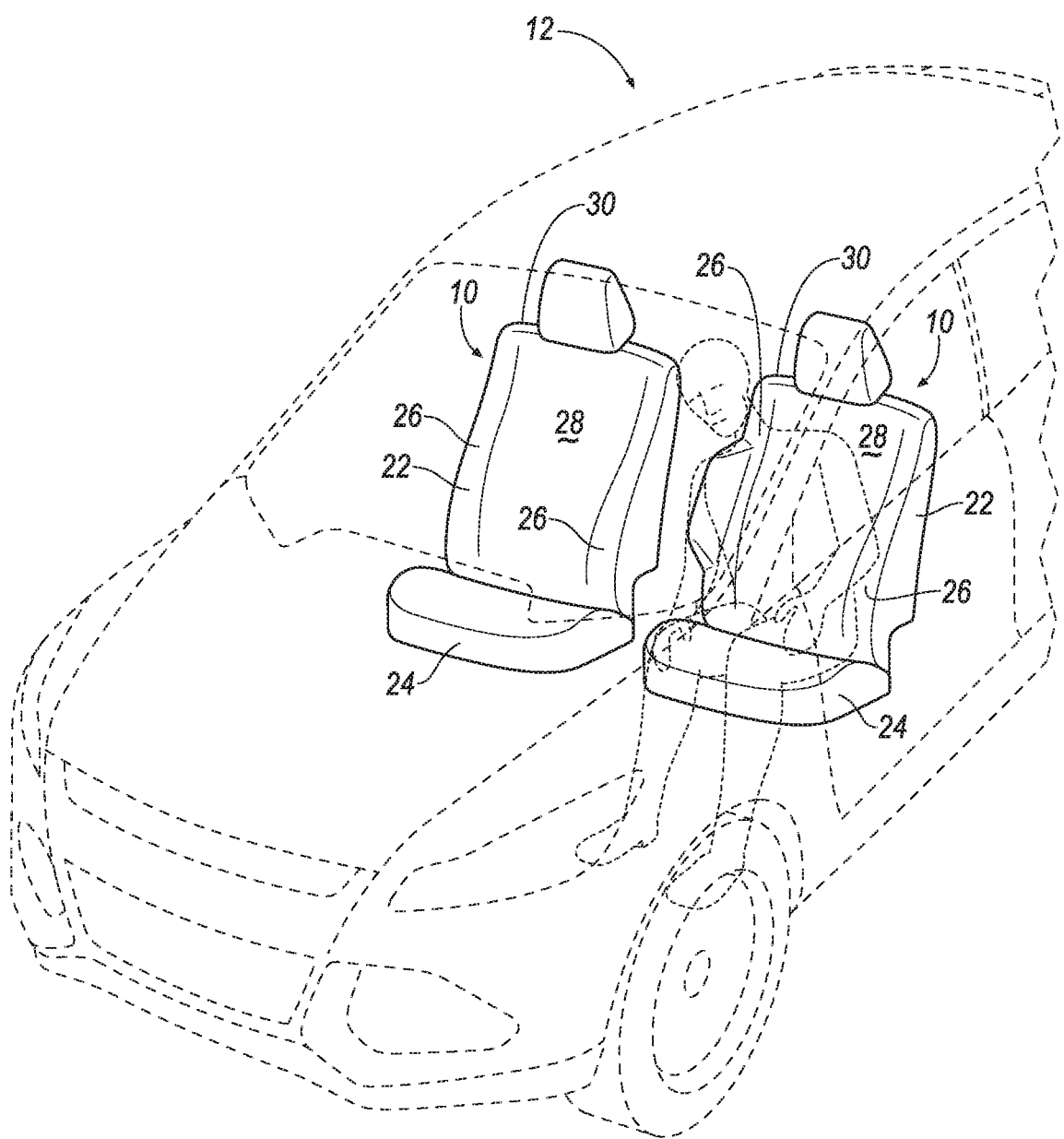
FIG. 2 is a perspective view of the vehicle with the left seat including a deployable device with a deployable plate in a deployed position.
Figure 3:
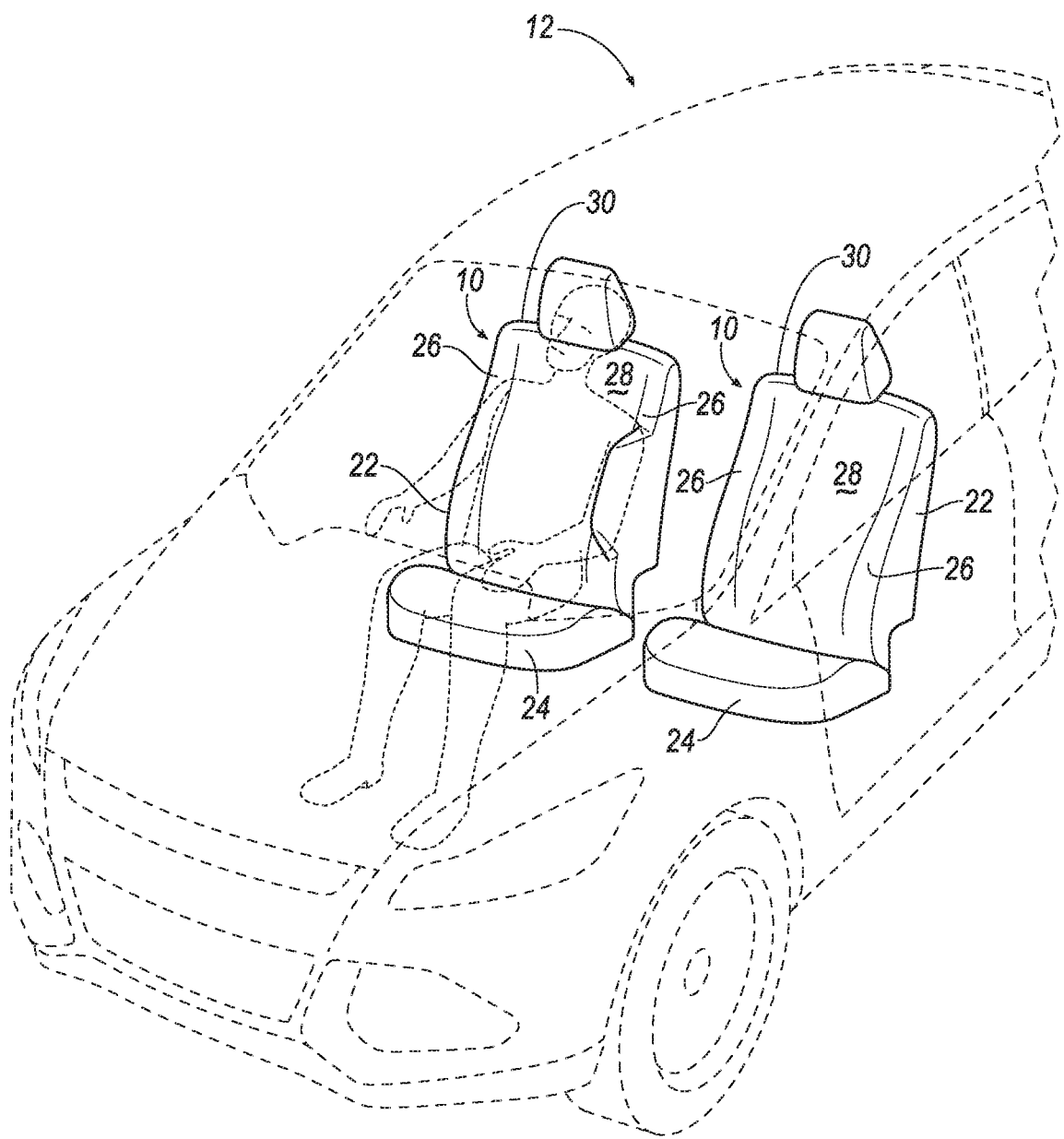
FIG. 3 is a perspective view of the vehicle with the right seat including the deployable device with the deployable plate in the deployed position.

During an oblique or side impact of the vehicle 12, an occupant (shown in broken lines in FIGS. 2 and 3) may be urged in a cross-vehicle direction, as shown in FIGS. 2 and 3. In response to the impact of the vehicle 12, the deployable plate 18 moves from the undeployed position to the deployed position. When the deployable plate 18 is in the deployed position, a torso and/or an arm of the occupant may contact the deployable plate 18, in which case the deployable plate 18 catches the occupant to reduce or stop the cross-vehicle movement of the occupant and absorb energy from the occupant. In other words, the deployable plate 18 provides a reaction surface reduce or stop the cross-vehicle movement of the occupant.

The vehicle 12 may be any suitable type of vehicle, e.g., an automobile, including a sedan, a pick-up truck, a sport-utility vehicle, etc. As shown in FIG. 1, the vehicle 12 includes a passenger cabin (not numbered) to house occupants, if any, of the vehicle 12.

The vehicle 12 includes one or more seats 10 in the passenger cabin. As one example, two seats 10 may be arranged as a front row, as shown in FIGS. 1-3. As other examples, two or more seats 10 may be arranged as a second row, third row, etc. Alternatively, one or more seats 10 may be arranged in the passenger cabin in any suitable arrangement. Common numerals are used to identify common features for the seats 10.

The seat 10 may be, for example, a bucket seat, as shown in FIGS. 1-3. As other examples, the seat 10 may be a bench seat or any other suitable type of seat. The seat 10 may face a fixed direction or may be adjustable to face different directions. As one example, the seat 10 may be fixed in a forward-facing direction, i.e., not swivelable. As another example, the seat 10 may be swivelable to face various directions chosen by the occupant.

With reference to FIGS. 1-3, each seat 10 includes a seat back 22 and a seat bottom 24. The seat back 22 is supported by and extends upwardly from the seat bottom 24. The seat back 22 may be adjustable relative to the seat bottom 24, i.e., may recline, and may include any suitable mechanism for such adjustment.

The seat back 22 includes the seat back frame 14. The seat back frame 14 may include panels and/or tubes, beams, etc. The seat back frame 14 may be formed of any suitable plastic and/or metal, e.g., carbon fiber reinforced plastic (CFRP), glass fiber-reinforced semi-finished thermoplastic composite (organosheet), steel, and/or aluminum, etc.

With reference to FIGS. 1-3, the seat back 22 includes a bolster 26 and a backrest 28 adjacent to the bolster 26. Specifically, the seat back 22 includes two bolsters 26 and the backrest 28 extends from one of the bolsters 26 to the other of the bolsters 26. The seat back 22 may terminate at the bolsters 26 in a cross-vehicle direction when the seat 10 is forward-facing. In other words, the bolsters 26 define left and right boundaries of the seat back 22. The backrest 28 extends between the bolsters 26 to support the back of an occupant seated on the seat 10. The bolsters 26 protrude forward from the backrest 28 such that the bolsters 26 extend along the sides of the occupant when the back of the occupant rests on the backrest 28. The bolsters 26 may extend along the backrest 28 upwardly from the seat bottom 24.

With reference to FIGS. 1-3, the seat back 22 includes a covering 30 supported on the seat back frame 14. The covering 30 may be cloth, leather, faux leather, or any other suitable material. The seat back 22 may include padding material 34 between the covering 30 and the seat back frame 14. The padding material 34 may be foam or any other suitable material. The covering 30 may be stitched in panels around the seat back frame 14 and padding material 34. The bolsters 26 may be formed by the padding material 34 and the covering 30.

The seat back 22 includes at least one deployable device 32. The deployable device 32 includes the mounting plate 16, the deployable plate 18, and the actuator 20. In response to a sensed vehicle 12 impact, e.g., an oblique impact or a side impact, the actuator 20 is actuated to deploy the deployable plate 18 to the deployed position. Common numerals are used to identify common elements of multiple deployable devices 32.

The deployable device 32 is supported by the seat back frame 14 and is disposed between the seat back frame 14 and the covering 30. The deployable device 32 may be disposed in one of the bolsters 26 when in the undeployed position, and may be disposed in or adjacent the bolster 26 in the deployed position.

The seat back 22 may include one or more deployable devices 32. As one example, the seat back 22 may include one single deployable device 32 in the bolster 26 on an inboard side of the seat back 22. As another example, the seat back 22 may include one deployable device 32 in the bolster 26 on the inboard side of the seat back 22 and another deployable device 32 in the bolster 26 on an outboard side of the seat back 22. In any event, the deployable plate 18 of any deployable device 32 may be selectively deployed to the deployed position based on the direction of impact and/or the direction that the seat 10 faces. For example, in an example where the seat 10 faces forward in the vehicle 12, the deployable plate 18 on one deployable device 32 on the vehicle 12 inboard side of the seat back 22 may be deployed in response to a detected far-side side impact and/or a far-side oblique impact. As another example, in an example where the seat 10 faces forward in the vehicle 12, the deployable plate 18 of one deployable device 32 on the vehicle 12 outboard side of the seat back 22 may be deployed in response to a detected near-side side impact and/or a near-side oblique impact.

With reference to FIGS. 4-7, the mounting plate 16 is fixed to the seat back frame 14. The mounting plate 16 may be fixed to the seat back frame 14 in any suitable fashion, e.g., with fasteners, welding, etc. The mounting plate 16 and the deployable plate 18 may be formed of the same or different types of material, and may be of any suitable type of material, e.g., a rigid polymer, a metal, a composite, etc.

Figure 7:
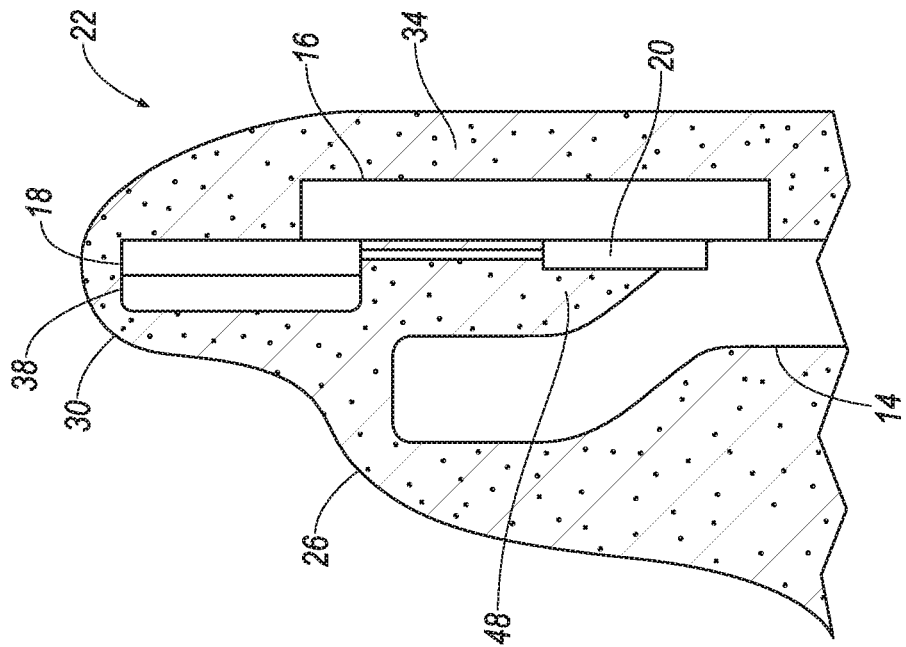
FIG. 7 is the cross-section FIG. 6 with the deployable plate in the deployed position.

The deployable plate 18 is supported by the mounting plate 16 and is moveable by the actuator 20 relative to the mounting plate 16. In the undeployed position, the deployable plate 18 is disposed between the seat back frame 14 and the covering 30 in the undeployed position. Specifically, the deployable plate 18 is disposed between the mounting plate 16 and the covering 30 in the undeployed position. As set forth above, the deployable plate 18 is moveable away from the seat back frame 14 from the undeployed position to the deployed position. Specifically, the deployable plate 18 is moveable toward the covering 30 from the undeployed position to the deployed position. As shown in FIGS. 4 and 6, in the undeployed position, the deployable plate 18 is retracted relative to the mounting plate 16 and the seat back frame 14. As shown in FIGS. 5 and 7, in the deployed position, the deployable plate 18 is extended relative to the mounting plate 16, e.g., in a vehicle 12-forward direction when the seat 10 is facing forward relative to the vehicle 12.

As one example, as shown in FIGS. 2 and 3, the deployable plate 18 may be disposed between the seat back frame 14 and the covering 30 in both the undeployed position and the deployed position. In other words, deployable plate 18 does not extend through the covering 30, and instead, only pushes the covering 30 outwardly, as shown in FIGS. 6 and 7. As another example, as shown in FIG. 8, the deployable plate 18 may be disposed between the seat back frame 14 and the covering 30 in the undeployed position, and may extend through the covering 30 in the deployed position. For example, the covering 30 may include a tear seam 36, and the deployable plate 18 extending through the tear seam 36 in the deployed position. The tear seam 36 may be an area of weak material, a perforated area, etc., that encourages the covering 30 to tear along the tear seam 36 when the deployable plate 18 moves to the deployed position.

The deployable device 32 may include a cushion 38 between the deployable plate 18 and the covering 30. The cushion 38 may absorb energy between the occupant and the deployable plate 18 when the deployable plate 18 is in the deployed position and the occupant impacts the deployable plate 18.

The cushion 38 may be fixed to the deployable plate 18, as shown in FIGS. 4-7. In such an example, the cushion 38 may be fixed to the deployable plate 18 in any suitable fashion, e.g., adhesive. As another example, the cushion 38 may be fixed relative to the covering 30. In such an example, the cushion 38 may be fixed to the covering 30 in any suitable fashion, e.g., adhesive, stitching, etc. The cushion 38 may be a single piece or may be multiple pieces.

The deployable plate 18 is between the mounting plate 16 and the cushion 38, and the cushion 38 is between the covering 30 and the deployable plate 18. In other words, the cushion 38 is between the occupant and both the deployable plate 18 and the mounting plate 16.

As set forth above, the deployable plate 18 is moveably engaged with the mounting plate 16. For example, the deployable plate 18 includes an inner surface 40 facing the mounting plate 16 and an outer surface 42 facing the backrest 28 (i.e., with or without intermediate components disposed therebetween), and the inner surface 40 is moveably engaged with the mounting plate 16.

As an example, the inner surface 40 of the deployable plate 18 may be slideably engaged with the mounting plate 16. For example, with reference to FIG. 6, the deployable device 32 may include a projection 44 on one of the mounting plate 16 and the deployable plate 18, and a track 46 on the other of the mounting plate 16 and the deployable plate 18 slideably receiving the projection 44. For example, as shown in FIG. 6, the projection 44 is on the deployable plate 18, and the track 46 is on the mounting plate 16. Alternatively, the projection 44 may be on the mounting plate 16 and the track 46 may be on the deployable plate 18. The track 46 may be recessed, i.e., a slot, as shown in FIG. 6. The track 46 and the projection 44 may have matching shapes, as shown in FIG. 6. In the alternative to FIG. 6, the deployable plate 18 may be moveably engaged with the mounting plate 16 in any suitable fashion. As shown in FIG. 6, the cushion 38 may be fixed to the outer face of the deployable plate 18.

With reference to FIGS. 4-7, the actuator 20 is positioned to move the deployable plate 18 relative to the mounting plate 16. The actuator 20 engages the deployable plate 18 to move the deployable plate 18 to the deployed position. As an example, in the undeployed position, the actuator 20 is disposed between the seat back frame 14 and the deployable plate 18. The actuator 20 may be disposed between the seat back frame 14 and the mounting plate 16. For example, as shown in FIGS. 6 and 7, the seat back frame 14 and the mounting plate 16 may define a gap 48 between the seat back frame 14 and the mounting plate 16. The actuator 20 may be disposed in the gap 48.

As an example, the actuator 20 may be fixed to the mounting plate 16, e.g., with fasteners, mounting features, etc. As another example, in addition to or in the alternative to being fixed to the mounting plate 16, the actuator 20 may be fixed to the seat back frame 14, e.g., with fasteners, mounting features, etc.

The actuator 20 may be, for example, a pyrotechnic actuator. For example, the pyrotechnic actuator 20 may include a cylindrical casing, a piston rod, a pyrotechnic charge, an electrical ignition device. In such an example, the pyrotechnic charge may be ignited to push the piston rod away from the cylindrical casing and toward the deployable plate 18 to force the deployable plate 18 to the deployed position.

The vehicle 12 may include an impact sensing system (not numbered). The impact sensing system may include an impact sensor and a controller. The controller is in communication with the actuator 20 and may include a processor and a memory. The memory stores instructions executable by the processor to control the actuator 20. The controller may be programmed to, upon identification of an impact, actuates the actuator 20, causing the actuator 20 to ignite the electrical ignition device and deploy the piston rod into the deployable plate 18.

The impact sensor may be in communication with the controller to communicate data to the controller. The impact sensor may use e.g., accelerometers, radar, lidar, and/or a vision system. The vision system may include one or more cameras, CCD image sensors, and/or CMOS image sensors, etc. Based on data communicated by the impact sensor, the controller may cause triggering of the actuator 20.

To facilitate communications, the controller, the impact sensor, the actuator 20, and other components in the vehicle 12 may be connected to a communication bus, such as a controller area network (CAN) bus, of the vehicle 12. The controller may use information from the communication bus to control the triggering of the actuator 20. The actuator 20 may be connected to the controller or may be connected to the communication bus.

In operation, the deployable plate 18 is in an undeployed position, as shown in FIG. 1, under normal operating conditions of the vehicle 12. When the impact sensor senses an impact of the vehicle 12, the impact sensing system triggers communication to the controller identifying the impact. The controller may selectively instruct, e.g., based on the type of impact, the actuator 20 to deploy the deployable plate 18 from the undeployed position to the deployed position. When the deployable plate 18 is in the deployed position, occupant may impact the deployable plate 18 to stop or reduce cross-vehicle movement of the occupant, e.g., during oblique impact or side impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
a seat back frame;
a mounting plate fixed to the seat back frame;
a deployable plate movably engaged with the mounting plate and moveable away from the seat back frame from an undeployed position to a deployed position;
a cushion fixed to the deployable plate;
a pyrotechnic actuator coupled to the deployable plate;
a bolster and a backrest adjacent to the bolster, the deployable plate being in the bolster and having an inner surface facing the mounting plate and an outer surface facing the backrest; and
wherein the cushion is fixed to the outer face of the deployable plate.

2. The seat as set forth in claim 1, further comprising a covering supported on the seat back frame, the deployable plate being moveable toward the covering from the undeployed position to the deployed position.

3. The seat as set forth in claim 2, wherein the deployable plate is between the mounting plate and the covering.

4. The seat as set forth in claim 1, the deployable plate being between the mounting plate and the cushion.

5. The seat as set forth in claim 4, further comprising a covering supported on the seat back frame, the cushion being between the covering and the deployable plate.

6. The seat as set forth in claim 1, further comprising a covering supported on the seat back frame, the deployable plate being disposed between the seat back frame and the covering in both the undeployed position and the deployed position.

7. The seat as set forth in claim 1, further comprising a covering supported on the seat back frame and including a tear seam, the deployable plate being between the covering and the seat back frame in the undeployed position, and the deployable plate and the cushion extending through the tear seam in the deployed position.

8. The seat as set forth in claim 1, wherein, in the undeployed position, the actuator is disposed between the seat back frame and the deployable plate.

9. The seat as set forth in claim 1, wherein the actuator is fixed to the seat mounting plate.

10. The seat as set forth in claim 1, further comprising a projection on one of the mounting plate and the deployable plate, and a track on the other of the mounting plate and the deployable plate slideably receiving the projection.

11. The seat as set forth in claim 1, further comprising a seat bottom coupled to the seat back frame.

12. The seat as set forth in claim 1, further comprising padding covering the seat back frame.

13. The seat as set forth in claim 12, wherein the cushion is between the padding and the deployable plate.

14. The seat as set forth in claim 12, wherein the deployable plate is between the cushion and the padding.

15. The seat as set forth in claim 12, further comprising a covering supported on the seat back frame, the padding between the covering and the mounting plate and between the covering and the cushion.

* * * * *